United States Patent [19]

Waizmann

[11] Patent Number: 5,592,879
[45] Date of Patent: Jan. 14, 1997

[54] METHOD AND APPARATUS FOR THE CONTACT-FREE REMOVAL OF DIRT FROM THE CYLINDERS OF PRINTING MACHINES

[75] Inventor: Franz Waizmann, Gessertshausen, Germany

[73] Assignee: Baldwin-Gegenheimer GmbH, Germany

[21] Appl. No.: 164,318

[22] Filed: Dec. 10, 1993

[30] Foreign Application Priority Data

Dec. 10, 1992 [DE] Germany ............... 42 41 575.6

[51] Int. Cl.⁶ ............................................. B41F 35/00
[52] U.S. Cl. ...................... 101/416.1; 101/423; 134/1
[58] Field of Search ................. 101/416.1, 417, 101/418, 419, 423, 425; 134/1; 355/296

[56] References Cited

U.S. PATENT DOCUMENTS

| | | | |
|---|---|---|---|
| 3,873,364 | 3/1975 | Smith | 134/138 |
| 4,082,038 | 4/1978 | Ueno et al. | 101/425 |
| 4,368,080 | 1/1983 | Langen et al. | 134/1 |
| 4,756,765 | 7/1988 | Woodroffe . | |
| 4,898,650 | 2/1990 | Wu et al. | 134/1 |
| 4,920,994 | 5/1990 | Nachbar . | |
| 5,068,750 | 11/1991 | Cook et al. | 134/1 |
| 5,138,945 | 8/1992 | Lee et al. | 101/425 |
| 5,151,134 | 9/1992 | Boquillon et al. | 134/1 |
| 5,151,135 | 9/1992 | Magee et al. | 134/1 |
| 5,213,040 | 5/1993 | Mihori et al. | 101/425 |

FOREIGN PATENT DOCUMENTS

| | | |
|---|---|---|
| 0419289 | 9/1990 | European Pat. Off. . |
| 3505449 | 2/1985 | Germany . |
| 3600591 | 1/1986 | Germany . |
| 3721940 | 7/1987 | Germany . |
| 4019915 | 6/1990 | Germany . |
| 0004947 | 1/1988 | Japan ............................ 101/425 |
| 1301319 | 12/1989 | Japan . |
| 2254721 | 10/1990 | Japan . |
| 8301400 | 10/1982 | WIPO . |

OTHER PUBLICATIONS

Patent Abstracts of Japan vol. 14, No. 91 (M-938) 20 Feb. 1990 & JP-A-01 301 319 (Daifoil Co) 5, Dec. 1989.
Patent Abstracts of Japan vol. 14, No. 584 (E-1018) 27 Dec. 1990 & JP-A-02 254 721 (Hitachi) 15 Oct. 1990.
Anon.; Elimination of Surface Debris in Laser Ablation of Polymers; *IBM Technical Disclosure Bulletin*, vol. 34, No. 4B, Sep. 1991, p. 233.
Hauser, Oscar G.; Plasma Air Knife Cleaner; *Xerox Disclosure Journal*, vol. 16, No. 6, Nov./Dec. 1991, p. 369.
Bigelow, Richard W.; Texturing of Organic Photoreceptor Surfaces by Laser Ablation to Assist Blade Cleaning; *Xerox Disclosure Journal*, vol. 16, No. 2, Mar./Apr. 1991, p. 141.
Ruzyllo, Jerzy; Issues in Dry Cleaning of Silicon Wafers; *Solid State Technology*, Mar. 1990, pp. 1–4.
Schade, Klaus; Suchanek, Gunnar; and Tiller, Hans–Jurgen; Plasmatechnik; *Velag Technik*, Berlin 1990, pp. 154/155.

*Primary Examiner*—John S. Hilten
*Attorney, Agent, or Firm*—Ostrolenk, Faber, Gerb & Soffen L.L.P.

[57] ABSTRACT

A method and apparatus for the contact-free removal of dirt in the form of residues of ink, fibers and dust on rotating cylinders in a printing machine by means of a laser beam which is directed onto the surface to be cleaned.

22 Claims, 1 Drawing Sheet

5,592,879

METHOD AND APPARATUS FOR THE CONTACT-FREE REMOVAL OF DIRT FROM THE CYLINDERS OF PRINTING MACHINES

BACKGROUND OF THE INVENTION

The present invention relates to a method and an apparatus for contact-free removal of dirt from various cylinders of printing machines.

International Application WO 89/01 412 discloses a system in which "blanket cylinders" are cleaned by spraying them with a mixture of water and a solvent. The particles of dirt which particularly consist of residues of printing ink from the inks transferred to the material being printed, of paper fibers of the material being printed, and of dust, are dissolved by the water/solvent mixture and are transferred in the press nip between two adjacent cylinders onto the material being printed as it passes through the press nip. This dirties the material being printed with the particles of dirt. In the subsequent dryer through which the web of material being printed then passes, the easily flammable solvent vapors, which evaporate from the material being printed, could cause an explosion or fire in the dryer if their concentration exceeds a maximum permissible value.

Furthermore, Federal Republic of Germany Application 30 05 469 A1 discloses a washing beam including means for washing the rubber blanket cylinders of a printing unit. The washing beam sprays water and/or solvent on the rubber blanket cylinder in order to soften and detach particles of dirt and then, by means of a wash cloth, wipes the dissolved particles of dirt off from the rubber blanket cylinder. The wash cloth is transported from a clean cloth roller to a dirty cloth roller, so that a clean section of wash cloth is always applied to the rubber blanket cylinder. The dirtied wash cloth must be frequently replaced. The washing beam undesirably requires a large amount of space, which affords difficulties since only a small amount of space is available between individual printing units of a printing machine.

There are also other objects, the cleaning of which requires a large amount of time and a large expense, including machine tools, metal articles from which rust is to be removed, household implements, and similar items. The invention is useful for them too.

European patent application publications EP 454 604, EP 451 304, EP 449 745 and DE 40 13 163, describe removal of (ablate) material from an article in order to change the shape of the article or to provide access through the outer layers of the article to its inner layers. In contrast to such machining and changing the surfaces of objects, no machining of an object is provided in the present invention. Instead, the object, and in particular its surface, is not changed. Furthermore, it is also known to provide layers of material to objects through the use of laser beams or to solder the layers by means of laser beams.

SUMMARY OF THE INVENTION

The present invention has as its object to provide a method and an apparatus by which various types of cylinders of printing machines can be cleaned more protectively, faster, and without disturbingly influencing adjacent objects, for instance by dirtying or moistening them, and with less expense for the apparatus. Another object is that the apparatus be so small structurally that it can be easily used in narrow places. In particular, cylinders to be cleaned by the invention include printing plate cylinders, rubber blanket cylinders and counter pressure cylinders in the printing units of printing machines.

In the invention, a laser beam is directed at the surface of the object to be cleaned for removing dirt from the object without altering the surface of the object.

BRIEF DESCRIPTION OF THE DRAWING

Other objects, features and advantages of the present invention are described with reference to the accompanying drawing.

DETAILED DESCRIPTION OF THE INVENTION

Figure 1:
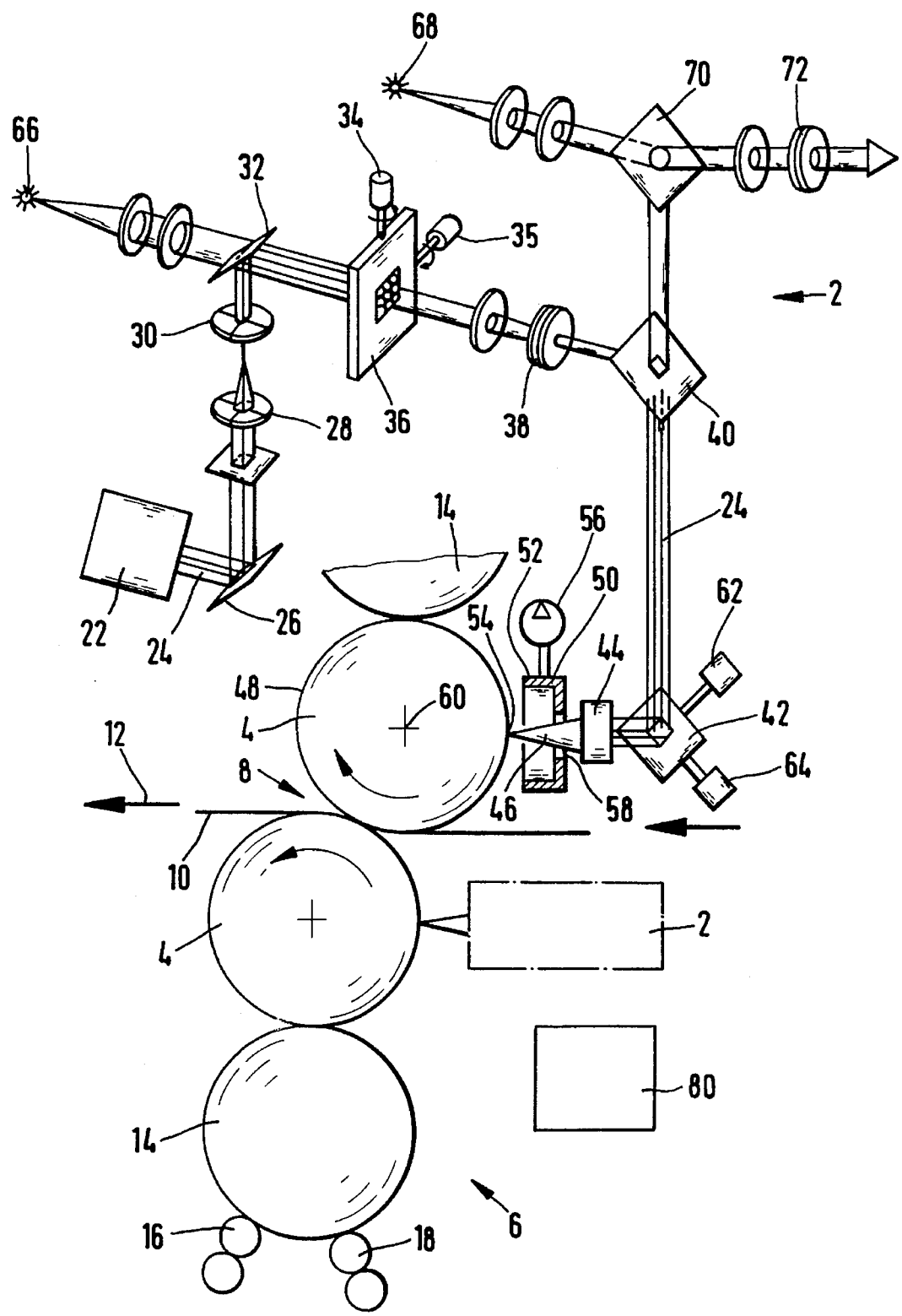
FIG. 1 schematically illustrates a preferred embodiment of the invention.

FIG. 1 diagrammatically shows a dirt removal apparatus 2 for the contact free removal of dirt from cylinders in printing machines. It is assumed in the following description that the cylinder being cleaned is a rubber blanket cylinder 4 in a printing unit 6 of a printing machine. The printing machine may be a roll printing machine for printing of webs of printed material or a sheet printing machine for printing individual sheets of printed material.

An upper rubber blanket cylinder 4 cooperates with a lower rubber blanket cylinder 4 to form a printing nip 8 through which material intended to be printed passes in the direction indicated by the arrow 12. The material is thereby printed with text or graphics by the rotating rubber blanket cylinders 4. The printing unit 6 may contain, in known manner, a printing plate cylinder 14, a dampening or moistening mechanism 16, and an inking mechanism 18. A device 2 for the contact free removal of dirt is also associated with the lower rubber blanket cylinder 4. The lower one of the devices 2 is developed in the same manner as the upper device 2 at the upper rubber blanket cylinder 4. Therefore, the lower one has been shown only schematically, in dash-dot line. Since the two devices 2 are identical, only the upper device 2 at the upper rubber blanket cylinder 4 is described below. The two devices 2 are controlled automatically by an electronic control device 80 for the printing machine of the printing unit 6 which control device includes a computer that operates as a function of the operation of the printing machine. The upper device 2 of the upper rubber blanket cylinder 4 can be operated at the same time as or shifted in time from the lower device 2 at the lower rubber blanket cylinder 4.

Each of the two devices 2 for the contact-free removal of dirt from the associated rubber blanket cylinder 4 contains an excimer laser 22 which produces a laser beam 24 which passes, in succession, a first mirror 26, a beam compressor 28 formed of cylindrical lenses, a split module or quad module 30, a second mirror 32, a diaphragm 36 which can be controlled by motors 34 and 35, a UV achromat 38, a third mirror 40, a fourth mirror 42 and an objective 44. The resulting focused laser beam 46 shines onto the outer surface 48 of the upper rubber blanket cylinder 4 which is to be cleaned and removes dirt from the outer surface 48 at the place of impingement of the laser beam. The "dirt" removed in particular includes residues of printing ink, paper fibers or pulp fibers from the material being printed 10 and dust. The beam energy of the focused laser beam 46 detaches the mechanical and chemical attachments of the particles of dirt on the outer surface 48 and drives them away from the surface 48.

The particles of dirt detached or driven away from the outer blanket surface 48 are drawn off by a vacuum device 50. The vacuum device has a vacuum hood 52 above the region 54 of the outer cylinder surface 48 to be cleaned. A suction flow generator 56 is connected to the suction hood 52. In the bottom of the suction hood 52, opposite the suction region 54, there is a slot 58 which extends over the entire length of the rubber blanket cylinder 4 parallel to its axis of rotation 60. The focused laser beam 46 passes through the slot 58 onto the outer surface 48 of the cylinder to be cleaned. Swinging of the mirror 42 by servomotors 62 and 64 moves the focused laser beam along a predetermined path and a predetermined distance within the dimensions of the slot 58 transverse, for instance perpendicular, to the motion of rotation of the outer surface 48 over the rotary blanket cylinder 4. This makes it possible to clean merely a given width or else the entire width of the rubber blanket cylinder 4 by the laser beam 46 at predetermined times and at predetermined places.

Instead of providing only a single focused laser beam 46, several such laser beams 46 can be directed from one or more sources of laser light 22 onto the outer surface 48 of the rubber blanket cylinder 4 to be cleaned. The focused laser beams 46 are preferably arranged alongside of each other so that only the front laser beam 46 is visible in FIG. 1, while the other laser beams are hidden behind it.

The laser beam 24, 46 is preferably not produced continuously, but rather is a pulsed beam. In this way, a good cleaning action can be obtained even with only a small amount of energy.

If a "split" module 28 is used for the preparation of the beam, then the excimer laser beam is split into two parallel, slightly converging individual beams. With the use of a "quad" module 28, the excimer laser beam is split into four parallel, slightly converging individual beams. These individual beams recombine in the object plane of the objective 44, which contains an adjustable beam diaphragm or mask.

The white light of a source of target illumination 66 is also focused via the second mirror 32 and the following mirrors as well as the achromat 38, in identical manner to the laser beam 24, 46, in the same focal plane on the surface 48 to be cleaned. That white light can be used as an indicator or a pilot beam for the laser beam. The source of target illumination 66 produces an illuminated area on the surface 48 to be cleaned. That illuminated area corresponds precisely to the beam contour of the focused excimer laser beam 46. In this way, the position of the focused excimer laser beam 46 is localized and the region 54 of the surface to be cleaned can be adjusted precisely on the surface 48.

The white light from another source 68 of white light 68 makes possible, via a fifth mirror 70 and a microscope 72, optical observation of the region 54 of the surface being cleaned by the focused laser beam 46. The white light passes via the fifth mirror 70 not only to the microscope 72 but also, via the third mirror 40 and the fourth mirror 42, to the region 54 of the surface to be cleaned. The second mirror 32, third mirror 40 and fifth mirror 70 are beam splitting mirrors.

The focused laser beam 46 cleans the outer surface 48 of the rubber blanket cylinder 4 without effecting any change in the surface 48. The laser beam 24, 46 preferably has a wavelength within the range of 100 nm to 400 nm. Its energy density is preferably within the range of 0.5 J/cm$^2$ to 150 J/cm$^2$. The beam cross section of the focused laser beam 46 on the outer surface 48 preferably has a size within the range of 10 µm×10 µm to 1000 µm×1000 µm. The relative speed of movement between the outer surface 48 of the rubber blanket cylinder 4 and the focused laser beam 46 transverse to the direction of the laser beam is preferably within the range of 0.5 mm/sec to 100 mm/sec in the direction of rotation of the rubber blanket cylinder 4 and/or parallel to the axis of rotation 60 of the cylinder. The pulse repetition rate of the focused laser beam is preferably within the range of between 1 Hz and 1 kHz, and the pulse duration is preferably within the range between 1 ns and 50 ns for so-called "excimer lasers".

The laser beams of excimer laser beam devices remove particles of dirt not primarily by generation of heat but essentially by the photo effect. Due to the high quantum energy of the photons of an excimer laser beam, chemical bonds in the material to be removed are broken. In this connection, practically no thermal influence is exerted on the outer surface 48 of the rubber blanket cylinder 4 to be cleaned. Furthermore, even very small spots of dirt, down to 1 µm, can still be precisely removed without changing the surface structure of the rubber blanket cylinder 4.

For cleaning rubber blanket cylinders 4 or other cylinders in printing machines, or for cleaning other objects, other known lasers can also be used, such as, for instance $CO_2$ or Nd-YAG lasers, with which removal of material by production of heat and vaporization of the material to be removed is possible. When such lasers are used, however, it is difficult to remove only dirt without the laser beam also changing the surface to be cleaned.

Upon the movement of the focused laser beam 46 transverse to the direction of the laser beam, the objective 44 is preferably always held at the same distance from the outer surface 48 to be cleaned.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A method for contact-free removal of dirt, ink, color residues, fibers and dust contained on a rotating surface of a cylinder, drum or roller in a printing machine while the cylinder, drum or roller is rotating, the rotating surface having a surface structure, the method comprising the steps of:

directing a laser beam onto the rotating surface of the cylinder, drum or roller; and controlling or adjusting the wavelength, energy density, beam cross section, relative speed, pulse repetition rate and pulse duration of the laser beam applied onto the rotating surface so that the laser beam directed onto the rotating surface removes the dirt from the rotating surface without changing the surface structure of the rotating surface.

2. The method of claim 1, wherein the laser beam has a wavelength in the range of 100 nm to 400 nm.

3. The method of claim 2, wherein the laser beam has an energy density within the range of 0.5 J/cm$^2$ to 150 J/cm$^2$.

4. The method of claim 1, wherein the laser beam has an energy density within the range of 0.5 J/cm$^2$ to 150 J/cm$^2$.

5. The method of claim 3, wherein the cross section of the laser beam shining on the object is adjusted to have a size within the range of 10 µm$^2$ to 1×10$^6$ µm$^2$.

6. The method of claim 2, wherein the cross section of the laser beam shining on the object is adjusted to have a size within the range of 10 µm$^2$ to 1×10$^6$ µm$^2$.

7. The method of claim 5, further comprising moving the laser beam and the surface to be cleaned relative to each other and transverse to the direction in which the laser beam is shining, the relative movement being at a speed in the range of 0.5 mm/sec to 1000 mm/sec.

8. The method of claim 1, further comprising moving the laser beam and the surface to be cleaned relative to each other and transverse to the direction in which the laser beam is shining, the relative movement being at a speed in the range of 0.5 mm/sec to 1000 mm/sec.

9. The method of claim 1, further comprising rotating the object having the surface to be cleaned during the period that the laser beam shines on the object and moving the laser on the surface to be cleaned transversely to the direction of the beam and parallel to the axis of rotation of the object.

10. The method of claim 1, further comprising moving the laser beam transversely to the direction that the beam is shining on the surface, and as the beam is moving with respect to the surface, maintaining the distance of a outlet for the laser beam from the surface to be cleaned at a constant distance.

11. The method of claim 1, further comprising pulsing the laser beam.

12. The method of claim 11, wherein the pulse repetition rate for the laser beam is in the range of 1 Hz to 1 kHz and the pulse duration is within the range of 1 ns to 50 ms.

13. The method of claim 1, wherein the laser source is an excimer laser.

14. The method of claim 1, wherein the directing of the laser beam is computer controlled as a function of the operation of the printing machine.

15. Apparatus for contact-free removal of dirt, ink, color residues, fibers and dust comprising:

a cylinder, drum or roller in a printing machine, the cylinder, drum or roller having a rotating surface, the rotating surface having a surface structure;

a laser beam source; and means for directing a laser beam from the laser beam source onto the rotating surface, the laser beam source controlling or adjusting the wavelength, energy density, beam cross section, relative speed, pulse repetition rate and pulse duration of the laser beam directed by said means for directing so that the laser beam shining on the rotating surface removes dirt from the rotating surface without changing the surface structure of the rotating surface.

16. The apparatus of claim 15, wherein the means for directing the laser beam on the surface comprises at least one mirror placed for deflecting the laser beam on its path from the laser beam source to the surface.

17. The apparatus of claim 15, further comprising first means for relatively moving the surface to be cleaned with respect to the laser beam so that the surface moves in a first direction transversely of the direction of shining of the laser beam, and second means for moving the laser beam over the surface along a second direction of movement transverse to the direction of the laser beam and transverse to the first direction of movement.

18. The apparatus of claim 15, further comprising first means for moving the laser beam in a first circumferential direction of movement of the cylinder surface transverse to the direction of the laser beam and second means for moving the laser beam along a second direction of movement in the longitudinal direction of the cylinder surface, and transversely to the direction of the laser beam and transversely to the first direction of movement.

19. The apparatus of claim 17, further comprising an optical observation and illumination system for optical observation of the laser beam cleaning process on the surface being cleaned.

20. The apparatus of claim 15, further comprising an optical observation and illumination system for optical observation of the laser beam cleaning process on the surface being cleaned.

21. The apparatus of claim 15, further comprising a suction device generally at the surface to be cleaned for drawing off dirt which has been removed by the laser beam from the object and removing dirt off the clean surface of the object.

22. The apparatus of claim 15, further comprising a plurality of the laser beams radiating onto the surface of the object to be cleaned.

\* \* \* \* \*